US010904278B2

(12) United States Patent
Lisle et al.

(10) Patent No.: US 10,904,278 B2
(45) Date of Patent: Jan. 26, 2021

(54) DETECTION SYSTEM FOR NETWORK SECURITY THREATS

(71) Applicant: AlienVault, Inc., San Mateo, CA (US)

(72) Inventors: Alex Lisle, Austin, TX (US); Roger Thornton, Austin, TX (US); Russell Spitler, Austin, TX (US); Jaime Blasco, San Francisco, CA (US)

(73) Assignee: Alien Vault, Inc., San Mateo, CA (US)

( * ) Notice: Subject to any disclaimer, the term of this patent is extended or adjusted under 35 U.S.C. 154(b) by 300 days.

(21) Appl. No.: 15/969,746

(22) Filed: May 2, 2018

(65) Prior Publication Data

US 2018/0343276 A1 Nov. 29, 2018

Related U.S. Application Data

(60) Provisional application No. 62/511,479, filed on May 26, 2017.

(51) Int. Cl.
*G06F 7/04* (2006.01)
*H04L 29/06* (2006.01)
*G06F 16/27* (2019.01)
*G06F 16/957* (2019.01)

(52) U.S. Cl.
CPC .......... *H04L 63/1425* (2013.01); *G06F 16/27* (2019.01); *G06F 16/9577* (2019.01)

(58) Field of Classification Search
CPC .......... H04L 63/1416; H04L 29/06891; G06F 21/56; G06F 21/554; G06F 2201/86; G06F 16/538
USPC .......................................................... 726/26
See application file for complete search history.

(56) References Cited

U.S. PATENT DOCUMENTS

| 7,225,343 B1 | 5/2007 | Honig et al. |
| 9,037,825 B1 | 5/2015 | Donlan |
| 9,069,930 B1 | 6/2015 | Hart |
| 9,813,449 B1 | 11/2017 | Buenechea et al. |
| 9,853,941 B2 | 12/2017 | Liang |

(Continued)

OTHER PUBLICATIONS

Bhatt et al, The Operational Role of Security Information and Event Management Systems, Oct. 2014, IEEE, pp. 35-41.*

(Continued)

*Primary Examiner* — Alexander Lagor
*Assistant Examiner* — Jenise E Jackson
(74) *Attorney, Agent, or Firm* — Hartman & Citrin LLC

(57) ABSTRACT

Techniques are disclosed relating to detection of network security threats. In some embodiments, a computer system receives network event information from network devices in a network. The computer system stores a set of received network event information in a first data store and performs analysis to identify a subset of the network event information. The computer system uses the subset of network event information to create, in a second data store, a model of a state of the network, and runs stored threat detection routines to query the second data store to detect threats to the network. The computer system provides an indication of threats detected in response to running the plurality of stored threat detection routines and, in response to receiving an indication of a user query regarding the network, provides query results determined based on accessing information in the first data store, but not the second data store.

20 Claims, 10 Drawing Sheets

(56) References Cited

U.S. PATENT DOCUMENTS

| | | |
|---|---|---|
| 2006/0069761 A1 | 3/2006 | Singh et al. |
| 2007/0130566 A1 | 6/2007 | van Rietschote et al. |
| 2012/0311562 A1 | 12/2012 | Wang et al. |
| 2013/0058346 A1 | 3/2013 | Sridharan et al. |
| 2013/0145006 A1 | 6/2013 | Tammam |
| 2013/0291073 A1 | 10/2013 | Dec |
| 2014/0181804 A1 | 6/2014 | Sakata |
| 2015/0142856 A1 | 5/2015 | Salinas et al. |
| 2015/0207846 A1 | 7/2015 | Famaey |
| 2016/0277431 A1 | 9/2016 | Yu |
| 2017/0032130 A1 | 2/2017 | Durairaj et al. |
| 2018/0069885 A1* | 3/2018 | Patterson ............ H04L 63/1425 |
| 2018/0139238 A1 | 5/2018 | Schultz |
| 2018/0232283 A1 | 8/2018 | Bryant et al. |
| 2018/0287966 A1 | 10/2018 | Kamath |
| 2019/0075126 A1* | 3/2019 | Muddu ................ G06F 3/0482 |
| 2019/0158524 A1* | 5/2019 | Zadeh .................... H04L 43/08 |
| 2019/0166047 A1 | 5/2019 | Ranjan |
| 2019/0296962 A1 | 9/2019 | Lisle et al. |
| 2020/0050607 A1* | 2/2020 | Pal ........................ G06F 9/4881 |

OTHER PUBLICATIONS

Anastasov et al, SIEM Implementation for Global and Distributed Environments, 2014, IEEE, pp. 1-6.*
U.S. Office Action dated Sep. 16, 2019 in U.S. Appl. No. 15/936,421.
U.S. Office Action dated Jan. 31, 2020 in U.S. Appl. No. 15/936,421.
Extended European Search Report in Appl. No. 18173981.4 dated Sep. 20, 2018, 7 pages.
U.S. Office Action dated May 26, 2020 in U.S. Appl. No. 15/936,421.

* cited by examiner

DETECTION SYSTEM FOR NETWORK SECURITY THREATS

The present application claims priority to U.S. Prov. Appl. No. 62/511,479, filed May 26, 2017, which is incorporated by reference herein in its entirety.

BACKGROUND

Technical Field

This disclosure relates generally to computer networks, and, more specifically, to detecting security threats associated with a computer network.

Description of the Related Art

Modern enterprise computer networks can have numerous potential vulnerabilities that could allow an intruder to gain access to a network. Since it is nearly impossible to identify and close every potential vulnerability, the field of network security has shifted from focusing on attempting to close every vulnerability to focusing on intruder detection. Detecting when a network becomes compromised is easier than ensuring a network is resilient to any and all threats. Being able to quickly and reliably detect the presence of an intruder, however, may still involve analyzing information from a large number of different sources in real-time, which can easily overwhelm a person, such as a network administrator, trying to monitor a network. As a result, various data analytics systems have been developed to collect and analyze a broad set of information about network devices and notify an administrator in the event that any anomaly is detected. These systems have commonly been referred to in industry as security information and event management (STEM) systems.

SIEM systems typically process information in accordance with one of two potential correlation models for identifying threats. Early SIEM systems often adopted a finite-state machine correlation model in which information would be collected from various sources and analyzed using a large number of finite state machines (FSMs). These FSMs would assess events and trigger alarms if particular sequences of events are detected. Later SIEM systems typically adopted a query-based correlation model. In this model, collected information is stored in a database, which is designed to maintain large volumes of data. Queries defined by an administrator would then be issued to the database to look for evidence of malicious activity.

SUMMARY

The present disclosure describes embodiments of a threat detection system that analyzes network event information collected from multiple sources associated with a network. In some embodiments, the system includes at least two data stores for storing the collected information. The first data store may maintain raw network event information, which can be queried by a user and used to run threat tests retroactively as new forms of threats are identified. The second data store may store a model of the state of the network that is derived from the collected network information and is updated as new network events are identified from processed network event information. The system can then run a plurality of stored threat detection routines to query the second data store to detect threats to the network and can provide an indication of threats detected in response to running the plurality of stored threat detection routines.

In some embodiments, the second data store is implemented using a data store (e.g., Triple store, a Resource Description Framework (RDF) store, graph database, etc.) that defines the model using a set of nodes and links that form a graph structure. As network-altering events occur and are identified from the processed network event information, nodes and links may be added, modified, or removed from the graph structure to reflect the changing state of the network. Threat detection routines may then examine the graph structure to identify particular, problematic paths through linked nodes that are indicative of potential security threats. If a problematic path is found, the system may generate an alarm provided via a user interface.

Figure 1:
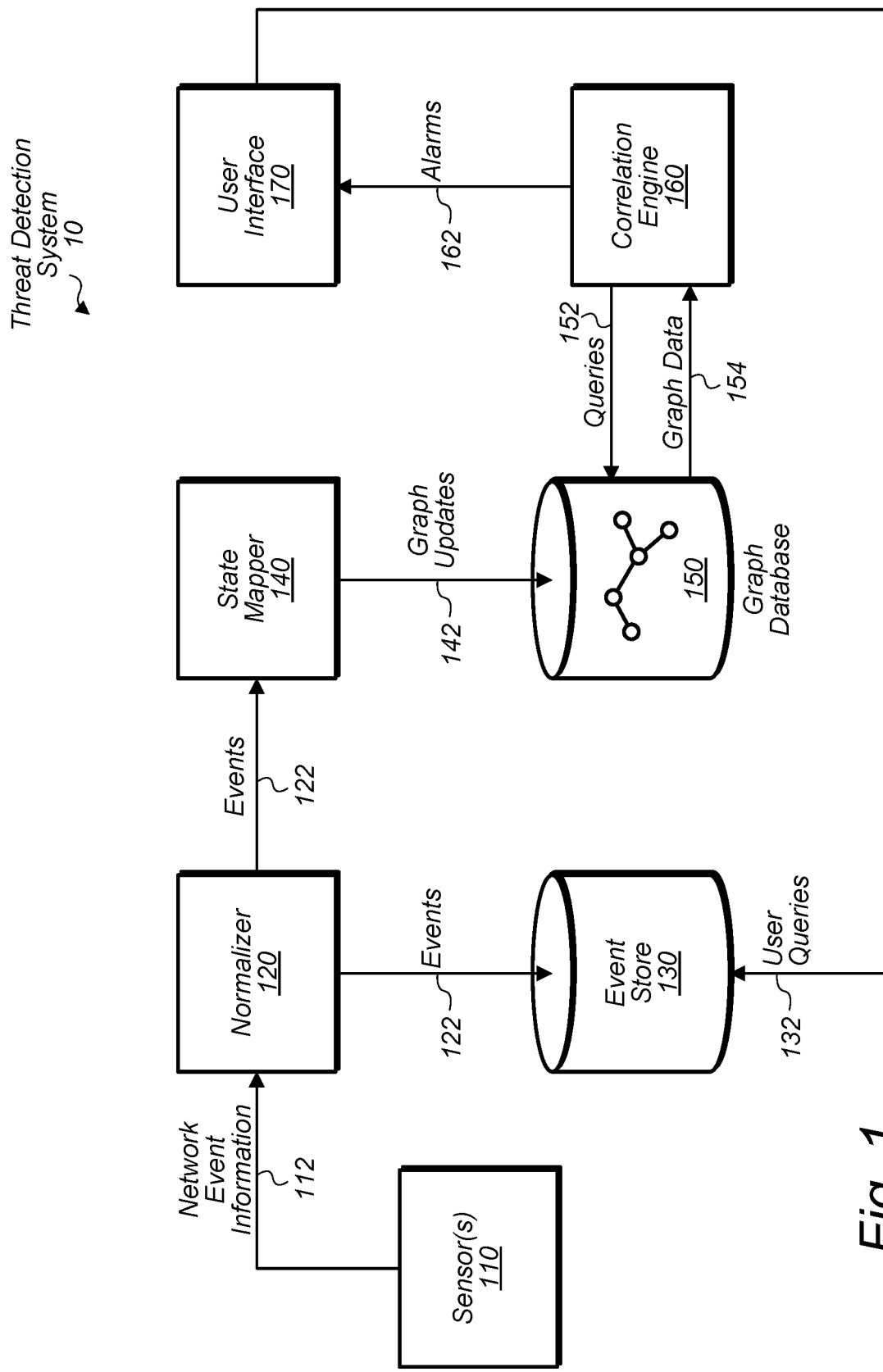
FIG. 1 is a block diagram illustrating one embodiment of a threat detection system.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "database configured to store data defining a graph structure" is intended to cover, for example, a computer system having program instructions stored therein and one or more storage devices in order to perform this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to"

perform that function and may be "configured to" perform the function after programming.

Reciting in the appended claims that a structure is "configured to" perform one or more tasks is expressly intended not to invoke 35 U.S.C. § 122(f) for that claim element. Accordingly, none of the claims in this application as filed are intended to be interpreted as having means-plus-function elements. Should Applicant wish to invoke Section 122(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a graph having multiple nodes, the terms "first" and "second" nodes can be used to refer to any two nodes in the graph. In other words, the "first" and "second" nodes are not limited to the initial two nodes added to the graph.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Both correlation models used by prior SIEM systems provided some advantages, but also suffered some significant deficiencies. The FSM correlation model could advantageously allow a large number of event patterns to be quickly analyzed; however, tracking state for a large number of FSMs proved to be cumbersome. Collected information was also discarded if it was not relevant to a particular FSM—and thus made it difficult (if not impossible) to retroactively test new FSMs on previously collected information. The query-based correlation model allowed assessments to be based on larger amounts of collected information and solved the issues with retroactively testing. This collected information, however, was unstructured until query time, which resulted in time-consuming queries against a large amount of raw data. It also relied on an administrator's expertise to know what to query and relied on an administrator to be up to date with new forms of threats.

The present disclosure describes embodiments of a threat detection system that attempts to overcome some of these shortcomings. As will be described in greater detail below in various embodiments, a threat detection system is disclosed that aggregates network event information collected from multiple devices associated with a network and maintains the network event information in two distinct data stores. Network event information placed into the first data store may be stored in a raw form in which the network event information undergoes minimal processing (or no processing in some embodiments) before placement. The first data store may be configured to maintain large amounts of network event information collected over time and provide results to user-initiated queries. Network event information placed into the second data store may undergo an initial processing in which the network event information is analyzed to identify events that alter a state of the network. These events may be observable behaviors of a device, software, or an end-user in a network computing environment and may include, for example, network devices establishing connections with one another or devices external to the network, users logging into network devices, software packages being installed on network devices, etc. A behavioral model indicative of the various current behaviors of these devices, software, and users is assembled and updated in the second data store based on the identified state-altering events. The second data store may contain only a subset of the network event information stored in the first database; however, the processed network event information stored in the second data store may be queried much more quickly and may be organized in a manner that allows useful insights to be gleaned about the interrelationship of the processed network event information. As the model is updated in the second data store, a correlation engine of the threat detection system may evaluate various detection heuristics by running multiple stored threat detection routines that assess various aspects about the model in order to identify potential threats and to generate corresponding notifications to an administrator.

In some embodiments discussed below, the second data store organizes processed information in a graph structure having multiple interconnected nodes modeling a state of the network. As new state-altering events are identified, these events may be represented in the graph structure by adding one or more nodes and linking the nodes to existing nodes in the structure based on how those events relate to the events associated with the other nodes. A given threat detection routine may be run that assesses the interconnection of particular nodes to determine whether particular paths exist between the nodes, the particular path or paths being indicative of a particular type of threat.

Turning now to FIG. 1, a block diagram of a threat detection system 10 is depicted. In the illustrated embodiment, system 10 includes sensors 110, normalizer 120, event store 130, state mapper 140, graph database 150, correlation engine 160, and user interface 170. In some embodiments, system 10 may include more (or less) elements than shown. For example, system 10 may include one or more additional databases that provide information to normalizer 120.

In order to detect potential network security threats, in various embodiments, sensors 110 are interspersed throughout a network in order to collect network event information 112 specifying information about the events occurring in the network. Network event information 112 may include any of various suitable types of information such as events witnessed by sensors 110 and forwarded to system 10, log files including text describing various aspects of a device, etc. Network event information 112 may also be collected from any suitable source of threat detection information such as computers coupled to the network (e.g., personal computers, mobile devices, servers, etc.), network hardware (e.g., routers, firewalls, switches, virtual private network (VPN) appliances, etc.), recourses (e.g., printers, scanners, appliances, etc.), or other suitable hardware. Network event information 112 may also be generated by the underlying hardware, the kernel in a device, or various software within a given device. As such, sensors 110 may be implemented in software and/or hardware to collect network event information 112 and provide it to components of system 10. Since network event information 112 can originate from multiple different sources, the network event information included in network event information 112 may be formatted differently from one log to the next. For example, in some instances, network event information 112 may include data formatted using a standardized syntax such as JavaScript Object Notation (JSON), Extensible Markup Language (XML), etc. In other instances, network event information 112 may include data formatted without any consistent syntax or language.

Normalizer 120, in one embodiment, takes network event information 112 from different sources and in different formats, and normalizes that information 112 into a standard format used throughout system 10. As will be described in further detail below with respect to FIG. 2, normalizer 120 may include multiple preprocessors that use different parsing schemes (e.g., JSON analysis, regular expressions, etc.) to target data from particular sources, such as particular device vendors, particular device types, etc. In various embodiments, normalizer 120 also collects information from one or more other sources and supplements the information in network event information 112 with this additional information to enrich the information being analyzed by threat detection system 10. (In some embodiments, this data enrichment may be performed by sensors 110.) In the illustrated embodiment, this enriched, reformatted network event information (e.g., shown as events 122) is provided to event store 130 and state mapper 140.

Event store 130, in one embodiment, is a data store that maintains information collected over time about a network. While event store 130 may use any suitable organization scheme, in some embodiments, event store 130 is implemented as a relational database management system (RDBMS). In contrast to graph database 150 discussed below, information stored in event store 130 may undergo minimal analysis (or no analysis other than that performed by normalizer 120) before being stored in event store 130. Information stored in event store 130 may also be a superset of the information stored in graph database 150. For example, in some embodiments, event store 130 serves as a central repository for all network event information collected by system 10 about a network. In various embodiments, event store 130 allows a user, such as an administrator, to submit user queries 132 via user interface 170 and to receive query results that are based on information that is not included in graph database 150. For example, if correlation engine 160 discussed below raises an alarm 162 with respect to a potential security threat, event store 130 may allow a user determine more information about the threat based on the extensive network event information stored in event store 130. Event store 130 may also allow threat tests to be performed retroactively, for example, if a new type of threat is subsequently discovered.

State mapper 140, in one embodiment, takes events 122 received from state mapper 140 and maps them to the changes they represent to the state of the network. As noted above, these events 122 may include network devices being coupled to or removed from a network, users logging into devices, the installation of software packages on devices, the establishment of connections between devices, the use of particular network protocols for communicating information, etc. Based on these identified events 122, in various embodiments, state mapper 140 assembles a model in graph database 150 that is indicative of past and current states of a network. As additional events 122 are received over time, state mapper 140 may provide graph updates 142 to reflect the changes to the state of the network in the model.

Graph database 150, in one embodiment, is another data store designed to store information defining a graph structure. As noted above, graph database 150 may be implemented using any suitable type of database such as Triple store, a Resource Description Framework (RDF) store, graph database, etc.—thus, although database 150 is referred to as "graph database 150" for ease of explanation, database 150 is not limited to a graph-database type. In this structure, particular pieces of data are placed in nodes/vertices that are connected together via links/edges representative of the relationships that exist between the information stored in the nodes. As will be described in greater detail below with FIG. 4, nodes included in the graph structure may correspond to various resources of a network such as the devices in the network (or external to the network but communicating through it), the users accessing the network, the software installed on network devices, the communication protocols being used, etc. Events 122 identified by state mapper 140 may be represented as statements by adding and/or interconnecting nodes. For example, a statement corresponding a user logging into a computer may be represented in the graph structure as a first node linked to a second node such that the first node stores an indicator of the particular user, the second node stores an indicator of the particular computer, and the link indicates the action of logging in. As additional nodes are linked to the first node or the second node, inferences can be made on how the user login relates to other network events.

Correlation engine 160, in one embodiment, analyzes the model in graph database 150 to evaluate various detection heuristics in order to detect potential indicators of security threats. As will be described in greater detail with respect to FIG. 5, in various embodiments, correlation engine 160 runs multiple stored threat detection routines that issue queries 152 for graph data 154 associated with particular indicators of security threats. These routines may analyze the graph structure to determine whether particular paths are present between particular nodes (or not present between particular nodes)—the presence or lack thereof being an indicator of a potential threat. If the criteria being assessed by a threat routine is satisfied, correlation engine 160 may present an alarm 162 corresponding to the potential threat via user interface 170. In additional to raising alarms 162, correlation engine 160 may also initiate various other actions based on the analysis of threat detection routines. For example, in some embodiments, correlation engine 160 can provide feedback to normalizer 120 to request additional information pertaining to a particular criterion being assessed by a given routine. This information may be obtained from event store 130 or by system 10 issuing a request to a network device for additional network event information. In some embodiments, correlation engine 160 can also take one or more corrective actions to thwart an intruder such as isolating a particular device from the network, locking down or disabling a device, etc.

As discussed in the introduction above, the use of two distinct data stores (e.g., event store 130 and graph database 150) may overcome disadvantages present in prior correlation models. In contrast to an FSM correlation model, the use of event store 130, in various embodiments, allows the collection of network event information that is not considered in the analysis performed by state mapper 140 or correlation engine 160. This collected network event information can then be later analyzed if it subsequently determined to be pertinent to a particular threat. The use of graph database 150, in various embodiments, allows for a more efficient storage of network event information and better inferences to be made on how different events occurring in a network are interrelated. In contrast to a query-based correlation model, the use of graph database 150, in various embodiments, allows queries to be serviced more quickly—and thus allowing for real-time analysis with respect to a network in some embodiments. The use of correlation engine 160 and the inferences gleaned from the graph structure may also place less of a burden on an administrator to know what to look for when monitoring a network while allowing detailed analysis of the network structure as well as the events surrounding it.

Figure 2:
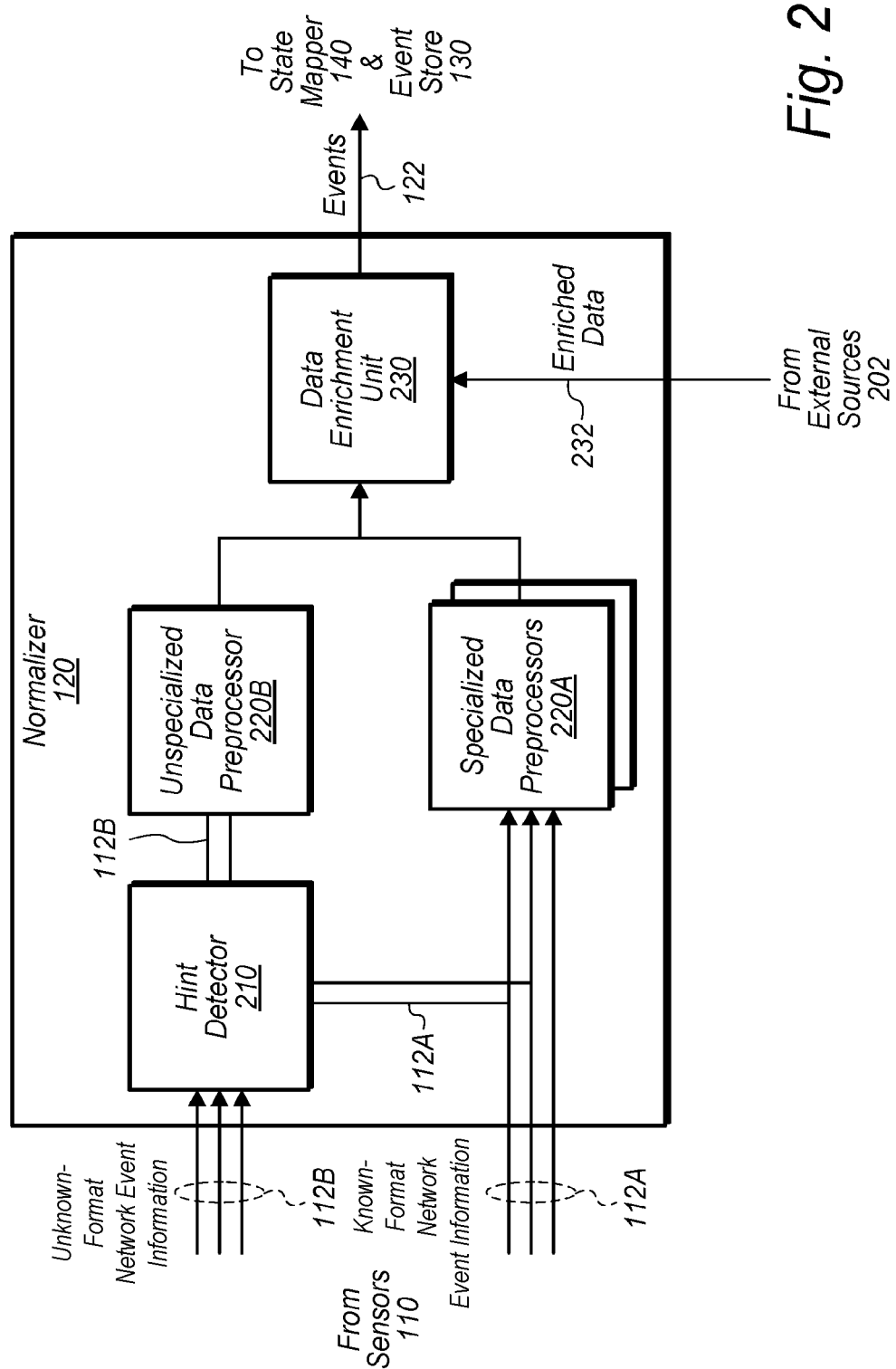
FIG. 2 is a block diagram illustrating one embodiment of a normalizer included in the threat detection system.

Turning now FIG. 2, a block diagram of normalizer 120 is depicted. In the illustrated embodiment, normalizer 120 includes a hint detector 210, multiple data preprocessors 220, and a data enrichment unit 230. In some embodiments, normalizer 120 may be implemented differently than shown. For example, data enrichment unit 230 may be located externally to normalizer 120, portions of normalizer 120 may be located in sensors 110, and normalizer 120 may also be one of several normalizers 120 in use by system 10.

As noted above, network event information 112 may originate from various, different sources and have different formats. In some instances, network event information 112 has information formatted in a known manner (shown as known-format network event information 112A) and may clearly indicate how the information is to be processed. For example, in some embodiments, a given sensor 110 may include an identifier in known-format network event information 112A that indicates what preprocessor 220 is supposed to process the known-format network event information 112A. If known-format network event information 112A is received, normalizer 120 may distribute it to the appropriate data preprocessor 220A specialized in processing that type of network event information 112A. In other instances, however, network event information 112 has information formatted in an unknown manner (shown as unknown-format network event information 112B). If unknown-format network event information 112B is received, the unknown-format network event information 112B is provided to hint detector 210.

Hint detector 210, in one embodiment, examines a set of network event information 112 to look for hints/indicators about how the information in the unknown-format network event information 112B is formatted. For example, if the set of unknown-format network event information 112B is a log file, hint detector 210 may examine the log's file extension, the Internet Protocol (IP) address where the log originated, an indicator of the sensor 110 providing the log, etc. Hint detector 210 can also parse unknown-format network event information 112B to look for particular key words that indicate an origin of the information, indicate the particular language being used, etc. For example, hint detector 210 may examine a set of unknown-format network event information 112B for a Cisco™ marker indicating that the unknown-format network event information 112B came from a Cisco™ manufactured device and determine that information in the unknown-format network event information 112B is expressed using a JSON syntax. If one or more hints can be found, hint detector 210 may route the unknown-format network event information 112 to one or more specialized data preprocessors 220A for parsing. In some embodiments, if hint detector 210 determines to provide a set of information 112 to multiple specialized data preprocessors 220A, normalizer 120 can examine the qualities of the outputs being produced by the preprocessors 220A (and preprocessor 220B in some embodiments) and select a particular one of the preprocessors 220A to process similar network event information 112 based on the quality of the output of that preprocessor 220A. If no hints can be found for unknown-format network event information 112B, hint detector 210 may provide the unknown-format network event information 112B to an unspecialized data preprocessor 220B.

Specialized data preprocessors 220A, in one embodiment, are operable to parse particular types of known-format network event information 112A having a known or potentially known format. For example, specialized data preprocessors 220A may include a preprocessor 220 that parses JSON data, a preprocessor 220 that parses XML data, etc. Specialized data preprocessors 220A may also be hierarchal. That is, some specialized data preprocessors 220A may be highly specialized and capable of producing a high-quality output when a very specific type of network event information 112 is received, while other specialized data preprocessors 220A may be less specialized, but capable of handling multiple similar types of network event information 112. For example, one specialized data preprocessor 220A might target network event information 112 produced by a specific router made by a particular manufacturer while another specialized data preprocessor 220A might target network event information 112 from different types of devices made by the same manufacturer (or a particular class of devices—e.g., routers). In some embodiments, specialized data preprocessors 220A may share one or more common components. For example, two specialized data preprocessors 220A may share the same JSON parser, but include different sets of rules defining which key-value pairs should be extracted from a particular set of network event information 112 and how the key-value pairs should be rearranged when presented to state mapper 140 in an event 122.

Unspecialized data preprocessor 220B, in one embodiment, is operable to parse unknown-format network event information 112B having an unknown format. In some embodiments, unspecialized data preprocessor 220B applies a set of regular expressions to a set of network event information 112 in order to identify potentially interesting data to be extracted. For example, unspecialized data preprocessor 220B may use regular expressions to capture IP addresses, user names, computer names, domain names, etc. In some instances, unspecialized data preprocessor 220B may produce a lesser quality output than unspecialized data preprocessor 220A, but can extract information from network event information 112 having inconsistent syntax or an unrecognizable format.

Data enrichment unit 230, in one embodiment, supplements information extracted from network event information 112 by preprocessors 220 with additional information (shown as enriched data 232) from other external sources 202. Enriched data 232 may come from various Internet sources, information collected from other computer networks being analyzed for threat detection, search engines, knowledge obtained from the threat detection community, etc. For example, in some embodiments, data enrichment unit 230 appends a geographic location for each IP address extracted from network event information 112, which can be used to identify potential anomalies. As another example, if extracted data includes words in a foreign language (e.g., French), data enrichment unit 230 may append the language. As yet another example, data enrichment unit 230 may append a flag when particular data is missing from a set of network event information 112. In the illustrated embodiment, data enrichment unit 230 provides this enriched, extracted data as events 122 to state mapper 140.

Figure 3:
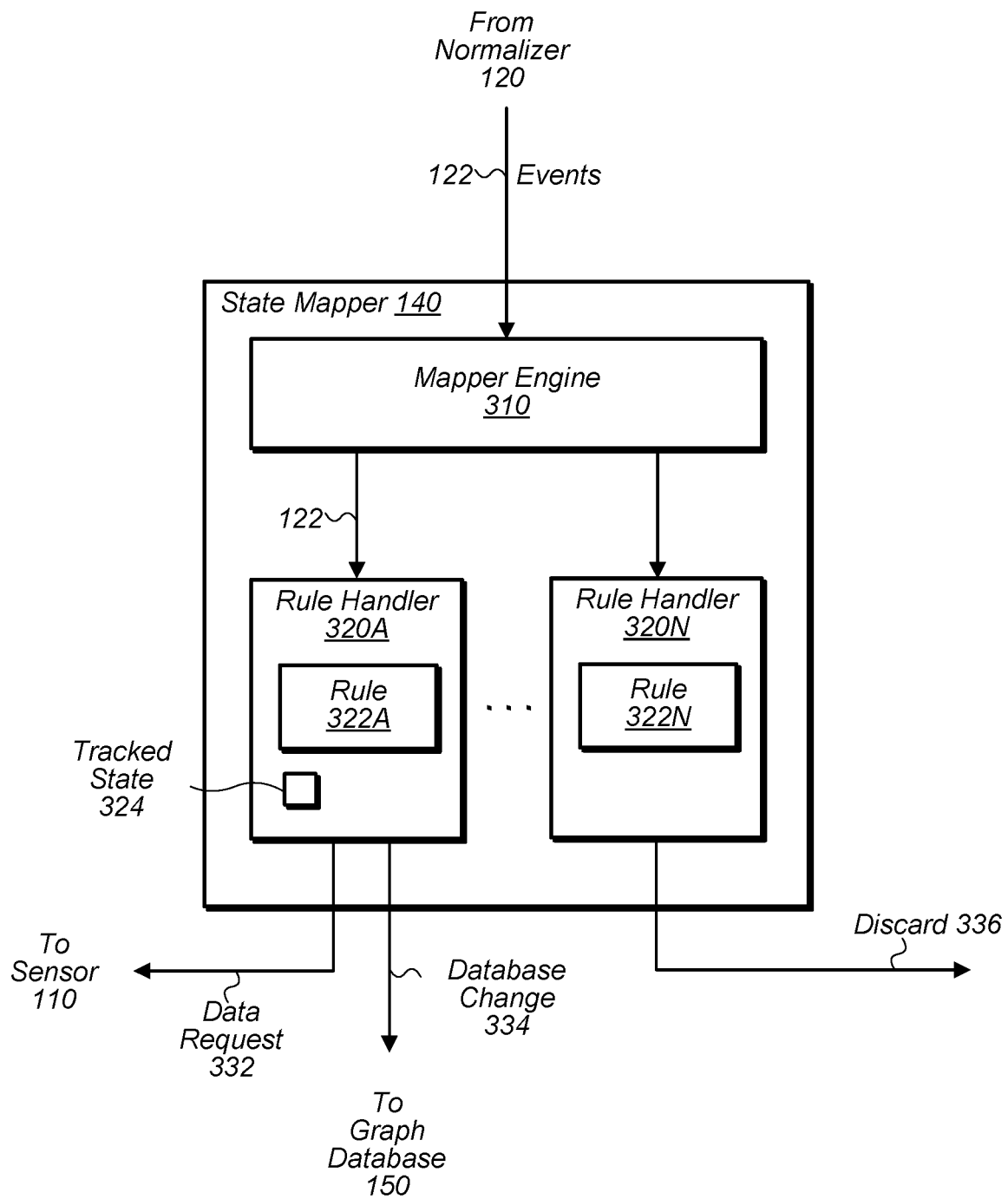
FIG. 3 is a block diagram illustrating one embodiment of a state mapper included in the threat detection system.

Turning now to FIG. 3, a block diagram of state mapper 140 is depicted. As noted above, state mapper 140 analyzes received events 122 from normalizer 120 to determine whether the events 122 alter a state of network and updates graph database 150 based on this analysis. In the illustrated embodiment, state mapper 140 includes a mapper engine 310 and multiple rule handers 320A-N.

Mapper engine 310, in one embodiment, distributes received events 122 to the appropriate rule handlers 320 capable of analyzing the events 122. In some embodiments, mapper engine 310 examines one or more values included in an event 122 to determine which rule handler 320 (or handlers 320) to route the event 122. In other embodiments, mapper engine 310 may merely route a copy of an event 122 to each handler 320 and allow the handlers 320 to determine whether they can process the event 122.

Rule handlers 320, in one embodiment, analyze received events 122 with respect to a stored rule 322 (or set of rules 322) in order to determine whether the event 122 satisfies the rule 322. Based on the event 122 satisfying the rule 322 (or not satisfying the rule 322), a rule handler 320 may take one or more actions indicated by the rule 322. As shown in FIG. 3, in some instances, a rule handler 320 may determine that additional data is warranted in its assessment and may issue a data request 332 to a sensor 110 to provide that additional data. In many instances, a rule handler 320 may merely perform a discard 336 of the event 122 if it is deemed to not be pertinent to the rule 322 being assessed. In other instances, rule handers 320 perform database changes 334 on graph database 150, which may include additive changes (i.e., adding of node or connection to the graph), reductive changes (i.e., removing a connection or node from the graph), or mutative changes (i.e., changing the connection from one node or another). For example, rule handler 320A may assess a rule 322A indicating that, if a user logs into a computer, a node for the user is to be added to graph database 150 and linked to a node corresponding to the computer. Similarly, another rule handler 320 may assess a rule 322 pertaining to user logouts and indicate that the node is to be removed responsive to the user logging out of the computer system. Additional examples are given below with respect to FIGS. 4A-4C.

In some embodiments, rule handler 320 may assess more complex rules 322 that dictate particular actions based on conditions tracked over time. In such an embodiment, a rule handler 320 may maintain tracked state 324 as one or more of these conditions become satisfied. For example, a particular rule 322 may define a finite state machine (FSM) to determine whether a sequence of conditions occurs in a particular ordering, and tracked state 324 may identify a current location in the FSM being assessed by the rule handler 320. The rule handler 320 may then update this state 324 as additional events 122 are identified and progression through the FSM is made.

Figure 4A:
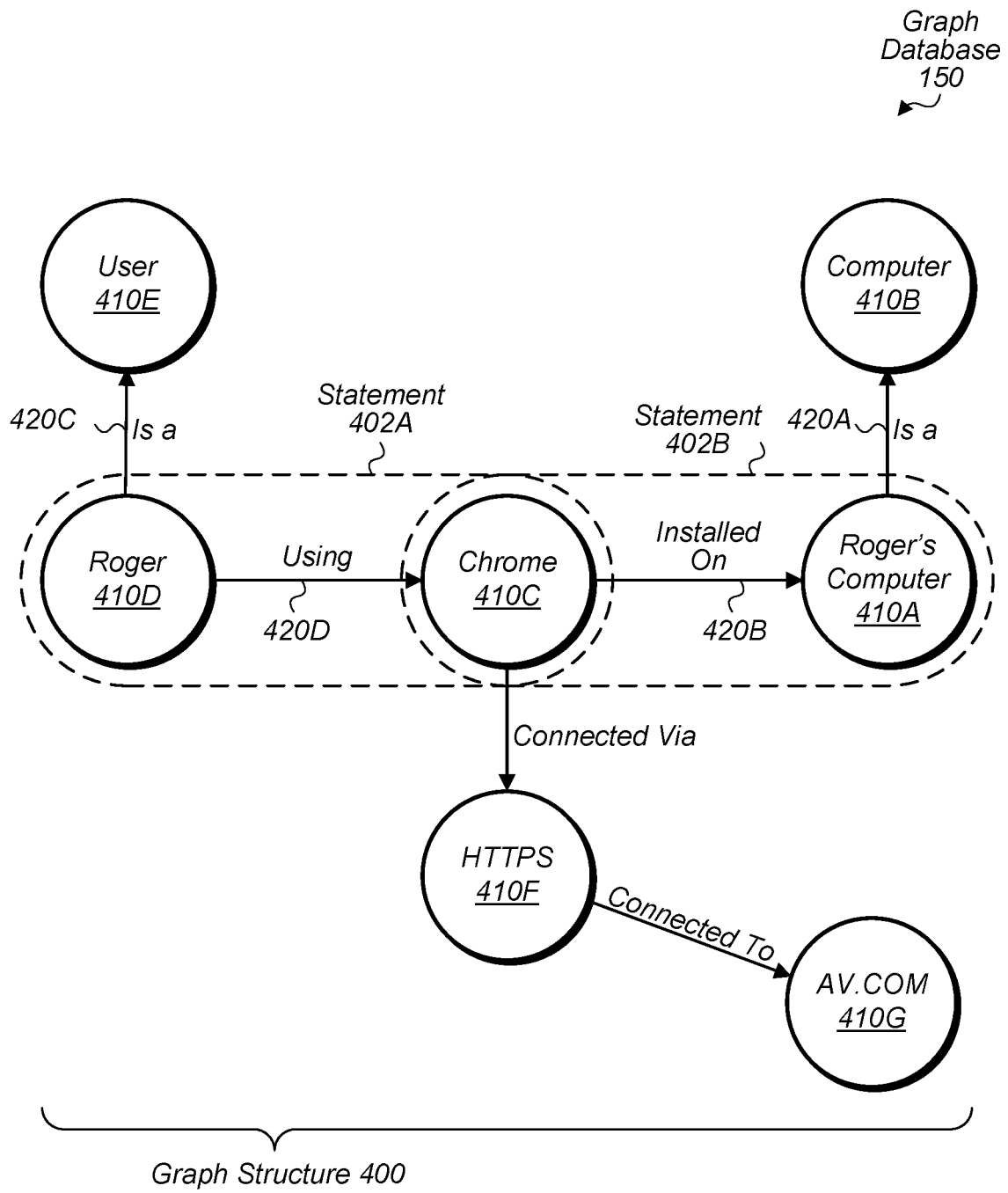
FIGS. 4A-4C are block diagrams illustrating embodiments of a database included in the threat detection system.

Turning now to FIG. 4A, a block diagram of graph database 150 is depicted. As noted above, graph database 150 may be designed to model a network state as events occur associated with the network. In the illustrated embodiment, graph database 150 stores data defining a graph structure 400 having a set of nodes 410A-41G (referred to herein collectively as "nodes 410" and/or singularly as "node 410") and links 420A-420D (referred to herein collectively as "links 420" and/or singularly as "link 420") that represent an exemplary network in which a user has logged into a computer and accessed a website AV.com.

These nodes 410 and links 420 may be assembled over time as state mapper 140 identifies state-altering events 122 and modifies graph structure 400. For example, state mapper 140 may begin by adding a node 410A for Roger's computer and associating it with a node 410B of connected computers via a link 420A in response to the event 122 of the Roger's computer joining the network. When the Chrome™ browser is later installed on Roger's computer, a node 410C is added and associated with node 410A to reflect this installation event 122. If the user Roger later logs in, a node 410D is add and associated via link 420C to a node 410E of current users. A link 420D may be added when Roger begins using the browser, and nodes 410F and 410G may be added when the browser makes a connection via the HTTPS protocol to the website AV.com. Notably, graph structure 400 includes nodes 410 for network assets (e.g., computers and software), but also nodes 410 for actors on those assets (e.g., users).

As noted above, in some embodiments, graph database 150 is implemented using a triplestore. In such an embodiment, graph structure 400 may be stored in a memory as a collection of statements 402A-402B (referred to herein collectively as "statements 402" and/or singularly as "statement 402"). Each statement 402 may correspond to an event 122 and represent the event as a set of three values: 1) a subject, 2) a predicate, and 3) an object—referred to as a triple. For example, the statement 402A may include a first value identifying node 410D for Roger, a second value identifying the link 420D for the predicate using, and a third value identifying node 410C for the object Chrome. Similarly, the installation of Chrome on Roger's computer may be represented as the statement 402B having a first value identifying node 410C for Chrome, a second value identifying the link 420B for the predicate installed on, and a third value identifying node 410A for Roger's computer. In other embodiments, statements 402 may include more than three values such as a timestamp when the event 122 occurred, a threat weight associated with the predicate/link, a confidence factor that particular relationship exists between two nodes 410, etc. In still other embodiments, graph database 150 may implement a different database scheme for storing graph structure 400 such as those discussed above.

Although only a small number of nodes 410 and links 420 are depicted in FIG. 4A, graph structure 400 may include a substantially larger number of nodes 410 and links 420. As noted above, nodes 410 may correspond to any of various suitable elements associated with a network such as computers, users, network hardware, mobile phones, physical locations of devices or users, protocols being used by the network, software packages installed on network elements, open sockets, characteristics of network elements (e.g., an element known to be compromised, known not to be compromised, known to be associated with a malicious website, etc.), accounts, companies, etc. Links 420 may also correspond to any suitable relationships between elements associated with a network such as connections between users and metadata (e.g., a user being authenticated or unauthenticated, a user being at a particular physical location, a user being a member of a particular user group, etc.), connections between devices and metadata (e.g., device being compromised or not), etc. Links 420 may be also be assigned weights based on the perceived threat of a given link. For example, if AV.com is a known malicious website, links 420 to node 410G may be weighted more heavily than links 420 to nodes 410 associated with other websites. Additional examples will now be presented with respect to FIGS. 4B and 4C.

Figure 4B:
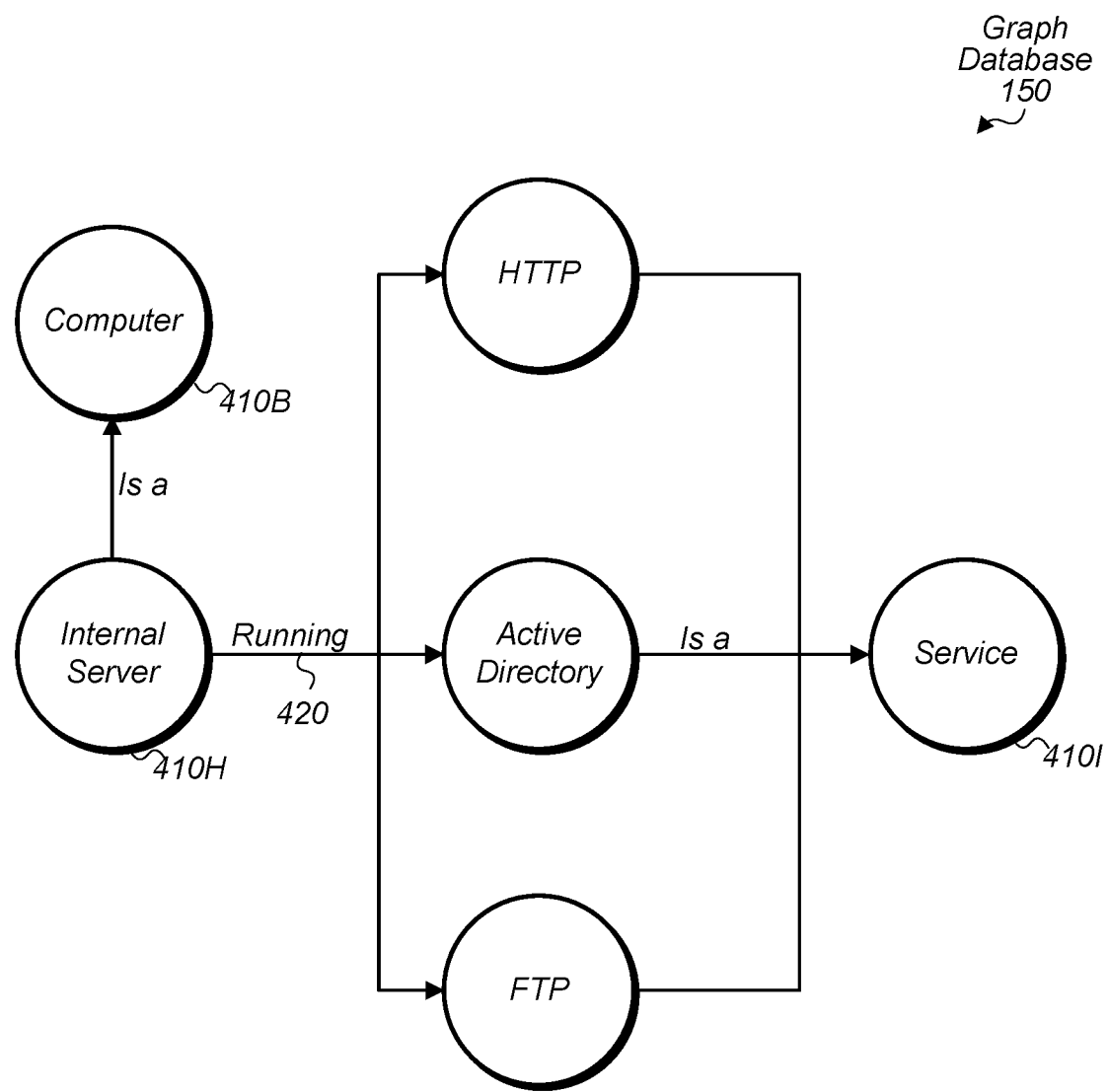

Turning now to FIG. 4B, another example of interconnected nodes 410 in graph database 150 is depicted. In this example, an internal server has begun running the services HTTP, Active Directory, and FTP. As shown, these events 122 may be represented as an internal server node 410H being linked to nodes 410 corresponding to HTTP, Active Directory, and FTP, which, in turn, are linked to the node 410I identifying them as services. Node 410H is also linked to node 410B as it is a computer. It is noted that linking a node 410 to another node that identifies its type (e.g., nodes 410B and 410I) may be beneficial for, not only easily determining a node's type, but also servicing particular types of queries 152. For example, a query for the computers coupled to a network can determine that Roger's computer and the internal server are coupled to the network by merely examining the nodes 410 directly linked to node 410B—i.e., nodes 410A and 410H in this example.

Figure 4C:
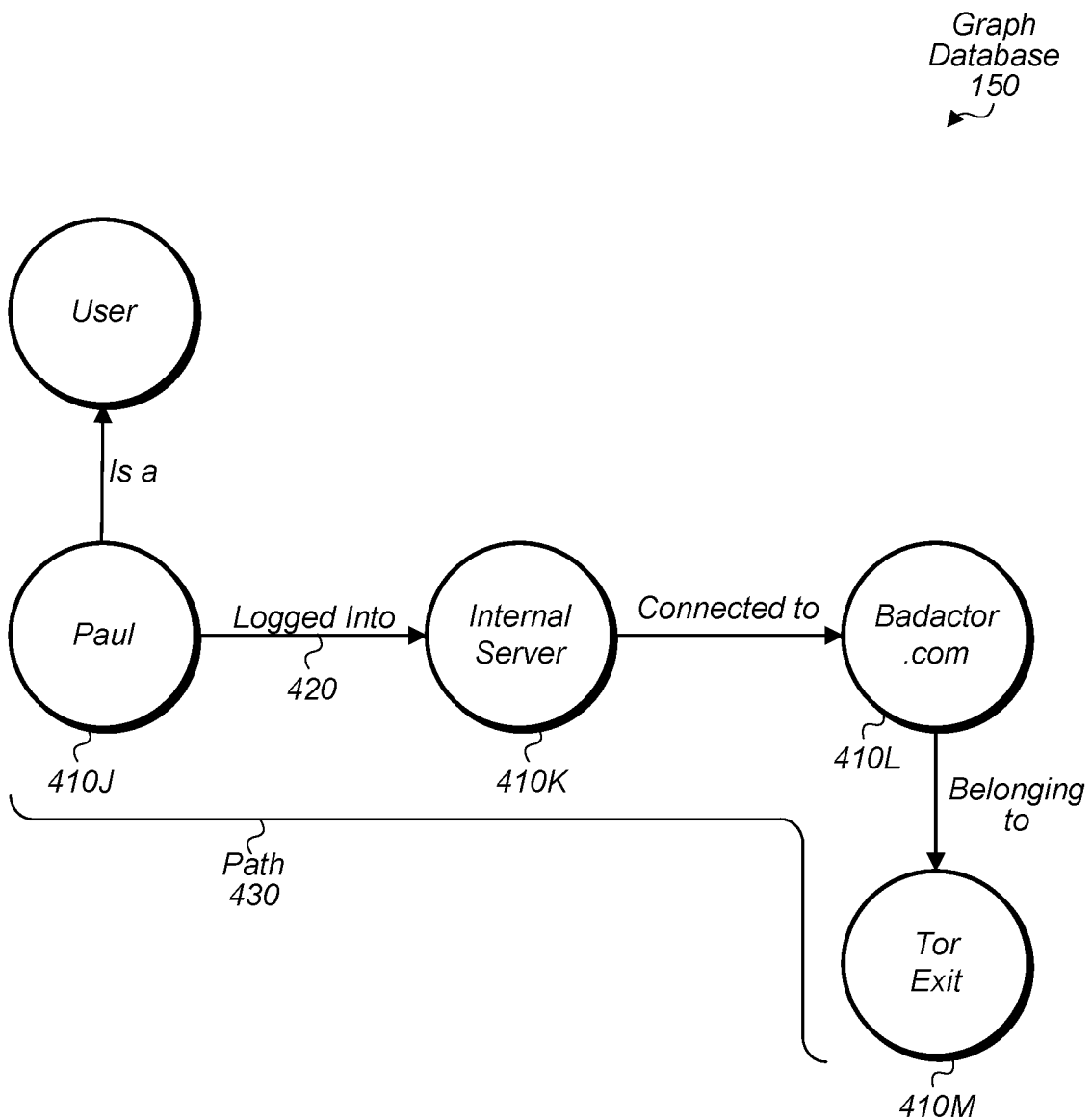

Turning now to FIG. 4C, another example of interconnected nodes 410 in graph database 150 is depicted. In this example, a user Paul has logged into the internal server and connected to a suspect website Badactor.com, which is known to belong to a Tor exit. As these events 122 (i.e., the logging in of Paul and the connecting to Badactor.com) occur and are reflected in graph database 150, a path 430 is created between nodes 410J-M through graph structure 400. As will be described next, a correlation engine may run threat detections to identify particular paths 430, such as the one depicted in FIG. 4C, which may be indicative of a potential security threat.

Figure 5:
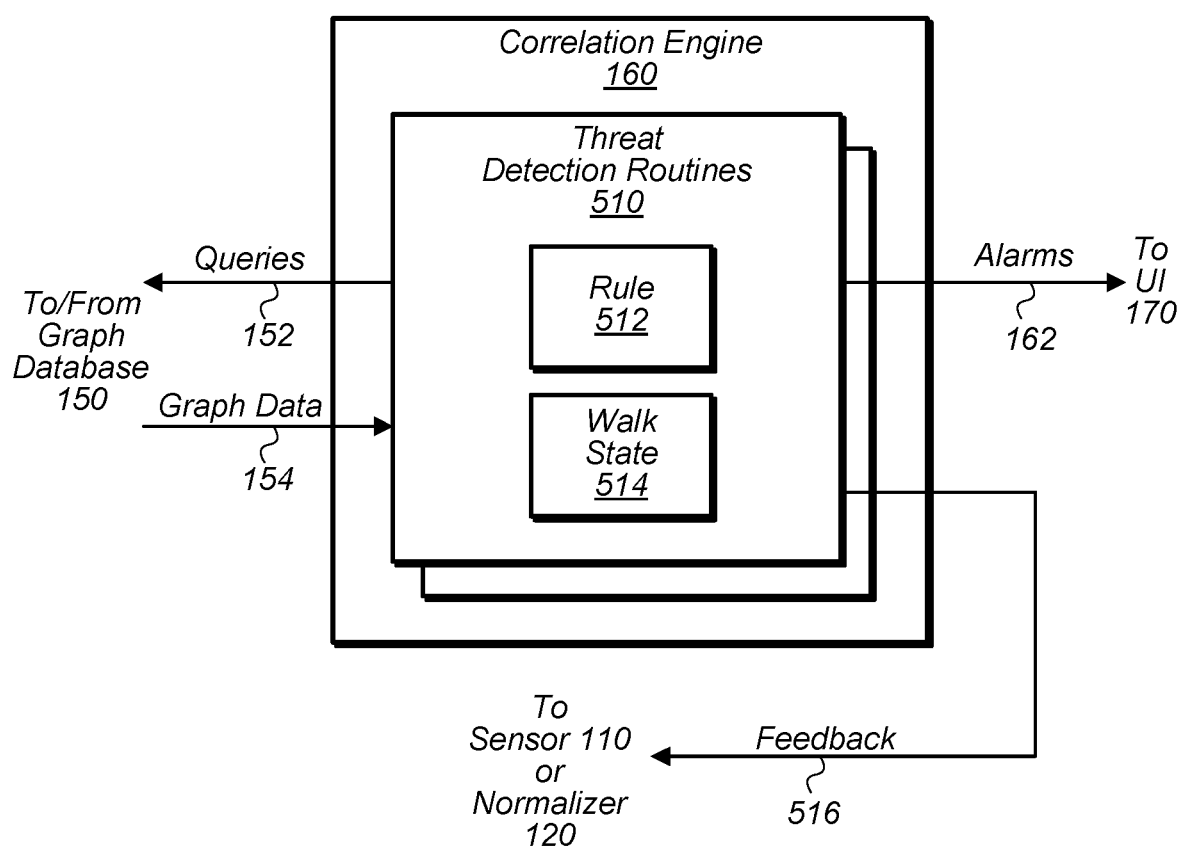
FIG. 5 is a block diagram illustrating one embodiment of a correlation engine included in the threat detection system.

Turning now to FIG. 5, a block diagram of correlation engine 160 is depicted. In the illustrated embodiment, correlation engine 160 includes a collection of threat detection routines 510.

As noted above, threat detection routines 510 may evaluate various detection heuristics by assessing the interconnection of particular nodes 410 to determine whether particular paths 430 exist (or do not exist) between the nodes 410. In the illustrated embodiment, each threat detection routine 510 looks for a particular path 430 (or set of paths 430) based on its respective rule 512, which may define the criteria for issuing queries 152 to obtain graph data 154 from graph database 150. In various embodiments, a given threat detection routine 510 attempts to identify a particular path 430 by walking graph structure 400—i.e., starting at an initial node 410 and attempting to traverse links 420 to subsequent nodes 410. For example, a threat detection routine 510 attempting to identify the path 430 depicted in FIG. 4C may start at node 410J for Paul, traverse the link 420 to node 410K for the internal server, and so forth. If a threat detection routine 510 reaches the end of its walk (e.g., node 410M identifying the Tor exit), the threat detection routine 510 may cause an alarm 162 to be raised on the user interface 170. In some embodiments, a threat detection routine 510 may also examine the delta of graph structure 400 over time with respect to one or more paths 430. For example, a threat detection routine 510 may determine that a particular path 430 was present one moment in time and then was removed at a later point (or not present and then added), which may be indicative of a particular threat. In such an embodiment, a threat detection routine 510 may determine what has changed in graph structure 400 by subtracting a first instance of graph structure 400 representative of the network state at one point time from a second instance of graph structure 400 representative of the network state at another point in time.

In some instances, a particular path 430 being walked by a threat detection routine 510 may not be complete as the events 122 are still being processed (or have yet to occur). A given threat detection routine 510 may maintain its own walk state 514 in order to subsequently identify where it is in the graph structure 400 (e.g., what node 410). Continuing with the example from FIG. 4C, a threat detection routine 510 may not be able to progress forward through path 430 until the connection is made to Badactor.com. As such, the threat detection routine 510 may store an indication that it is at node 410K for the internal server. If the threat detection routine 510 is suspended and later resumed, it can start at the location indicated by its walk state 514 (as opposed to the beginning of the path 430—e.g., node 410J). If the connection to Badactor.com has been recorded in database 150, the threat detection routine 510 can proceed further in path 430.

In some embodiments, a threat detection routine 510 may provide feedback 516 to sensor 110 or normalizer 120 to request for additional information that may be pertinent to its walk through graph structure 400. For example, a threat detection routine 510 attempting to identify an intruder's theft of confidential files might initially determine, based on its walk, that confidential files were transferred from a file server. In response to making this determination, the threat detection routine 510 may issue feedback 516 requesting to know whether an authorized user was logged into the computer downloading the secure files. If a sensor 110 is able to provide this information, the threat detection routine 510 may be able to continue its walk and eventually determine that no user was logged in when the files were downloaded. Thus, the threat detection routine 510 may raise an alarm 162.

Figure 6A:
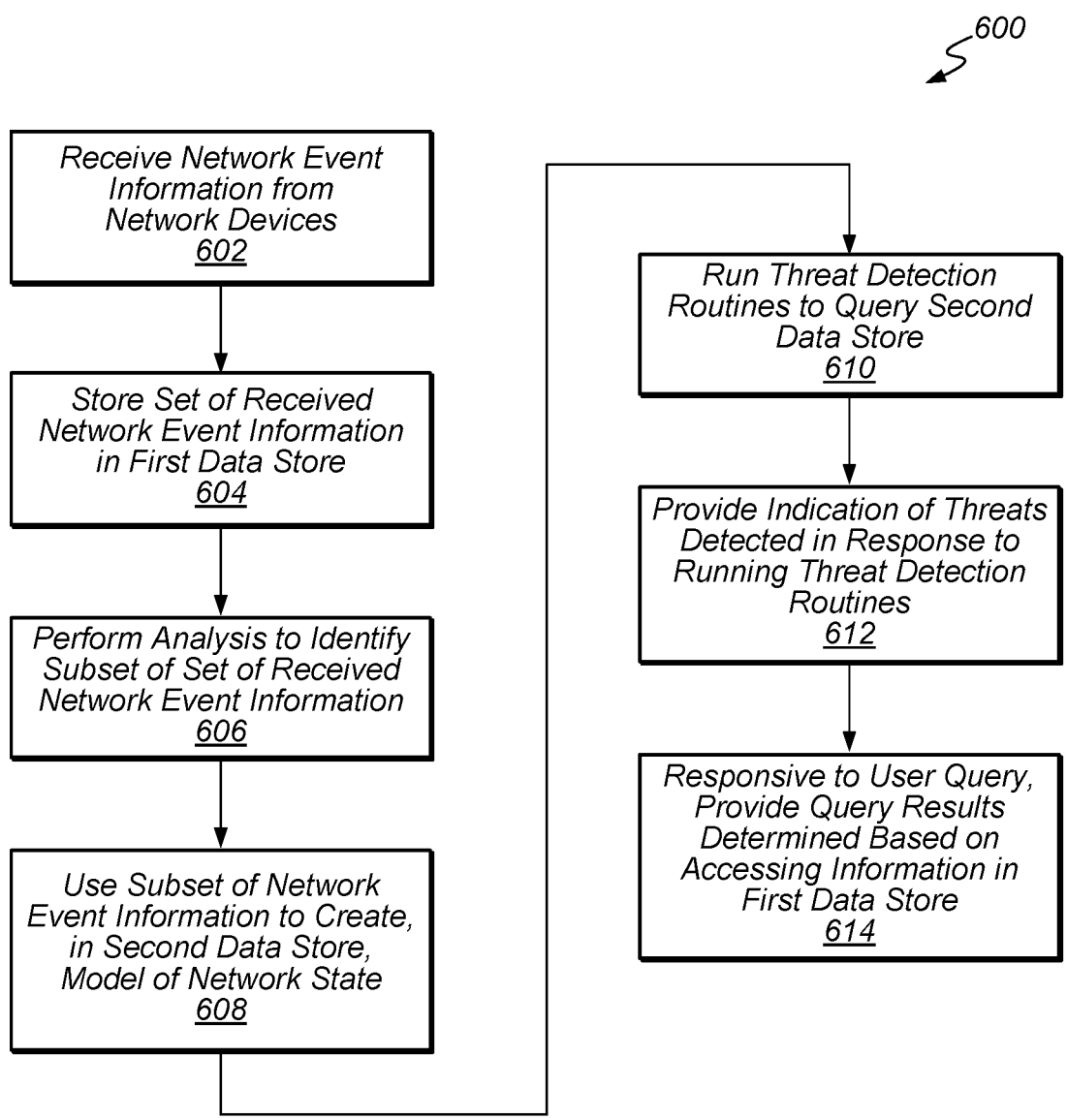
FIGS. 6A-B are flow diagrams illustrating embodiments of methods associated with threat detection.

Turning now to FIG. 6A, a flow diagram of a method 600 is depicted. Method 600 is one embodiment of a method that may be performed by a computer system attempting to implement threat detection for a network. In some embodiments, the computer system is a cloud computing system configured to maintain first and second data stores. In many instances, performance of method 600 allows threat detection analysis to be performed more quickly while still preserving network event information for any retroactive review.

Method 600 begins in step 602 with receiving network event information (e.g., network event information 112) from a plurality of network devices in a network and, in step 604, storing a set of the received network event information in a first data store (e.g., event store 130). In various embodiments, the received network event information is parsed (e.g., by normalizer 120) to produce normalized network event information (e.g., events 122), which is stored as the set of received network event information in the first data store. In some embodiments, a plurality of parsers (e.g., preprocessors 220) are applied to the received network event information, and the outputs from one or more of the plurality of parses are selected based on a quality of information output from the one or more parsers. In some embodiments, additional information is received (e.g., enriched data) from one or more sources other than the plurality of network devices and included in the normalized network event information.

In step 606, an analysis is performed to identify a subset of the set of received network event information. In various embodiments, the subset of network event information identifies events determined, in the analysis, to alter the state of the network. In step 608, the subset of network event information is used to create, in a second data store (e.g., database 150), a model of a state of the network. In some embodiments, the second data store is formatted as a graph structure (e.g., graph 400) including a plurality of nodes linked together (e.g., nodes 410 with links 420) based on the determined events. In some embodiments, the plurality of nodes includes nodes representative of ones of the plurality of network devices (e.g., Roger's computer node 410A), nodes representative of users of the network devices (e.g., Roger node 410D), and nodes representative of software installed on the network devices (e.g., Chrome node 410C).

In various embodiments, an event is represented in the graph structure as a first node having a link to a second node (e.g., a statement 402) such that the link identifies a predicate having the first node as a subject and the second node as an object. In some embodiments, the event is a login of a particular user into a particular network device such that the first node (e.g., node 410J) is representative of the particular user, the link is representative of the login, and the second node is representative of the particular network device (e.g., node 410K). In some embodiments, the event is an establishment of a network connection by a particular network device such that the first node is representative of the particular network device (e.g., node 410K) and the link is representative of the establishment of the network connection.

In step 610, a plurality of stored threat detection routines (e.g., threat detection routines 510) are run to query the second data store to detect threats to the network. In various embodiments, running one of the plurality of stored detection routines includes querying the second data store to determine whether a path (e.g., a path 430) of links exists between a first node and a second node included in the graph structure. In some embodiments, step 610 includes determining, from running one of the plurality of stored threat detection routines, that additional network event information is warranted and issuing a request (e.g., feedback 516) for the additional network event information to one of the plurality of network devices.

In step 612, an indication of threats detected is provided in response to running the plurality of stored threat detection routine. In step 614, in response to receiving an indication of a user query (e.g., a query 132) regarding the network, query results are provided that are determined based on accessing information in the first data store that is not stored in the second data store. In some embodiments, the indication of threats and the query results are provided as a service to an operator of the network.

Figure 6B:
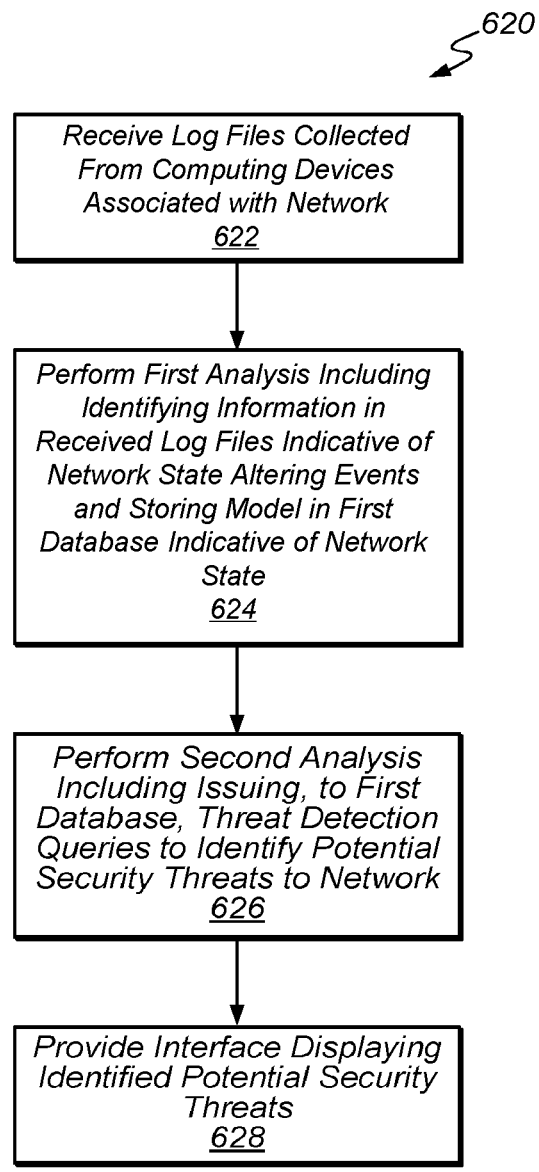

Turning now to FIG. 6B, a flow diagram of a method 620 is depicted. Method 620 is one embodiment of another method that may be performed by a computer system attempting to implement threat detection for a network.

Method 620 begins in step 622 with receiving log files (e.g., log files included in network event information 112) collected from a plurality of computing devices (e.g., devices including sensors 110) associated with a network. In step 624, a first analysis is performed that includes identifying information in received log files that is indicative of events that alter a state of the network and, based on the identified information, storing a model in a first database (e.g., database 150), the model being indicative of the state of the network. In some embodiments, the model is a graph that includes a plurality of linked nodes (e.g., nodes 410) representative of elements associated within the network. In step 626, a second analysis is performed that includes issuing, to the first database, threat detection queries (e.g., queries 152) to identify potential security threats to the network. In various embodiments, one of the issued threat detection queries inquires whether a path exists through two or more nodes in the graph (e.g., graph 400). In step 628, an interface (e.g., user interface 170) is provided displaying the identified potential security threats. In some embodiments, method 620 further includes storing information from the received log files in a second database (e.g., event store 130) and providing information from the second database in response to user queries (e.g., user queries 132) received via the interface. In some embodiments, the first database includes only a subset of the log information stored in the second database.

Exemplary Computer System

Figure 7:
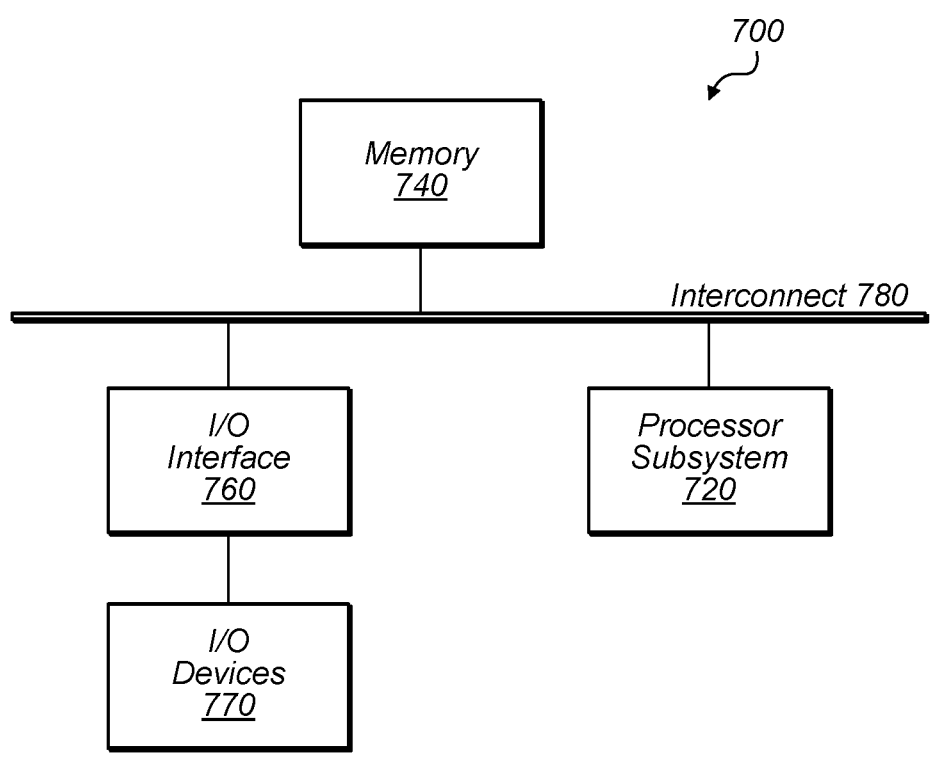
FIG. 7 is a block diagram illustrating one embodiment of an exemplary computer system, which may implement functionality described herein.

Turning now to FIG. 7, a block diagram of an exemplary computer system 700, which may implement one or more of elements 110-170, is depicted. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together to implement a computer cluster or cloud system. In various embodiments, system 700 may provide functionality described herein (such as the presentation of user interface 170) via a Software as a Service (SaaS) or Platform as a Service (PaaS) distribution model.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 740. Rather, computer system 700 may also include other forms of storage such as cache memory in processor subsystem 720 and secondary storage on I/O Devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 770 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   receiving, by a computer system comprising a processor, network event information from a plurality of network devices in a network, wherein the network event information is associated with a plurality of different formats;
   normalizing, by the computer system, the network event information to produce normalized network event information, wherein normalizing the network event information comprises
      determining, by the computer system, that at least a portion of the network event information is associated with a format of the plurality of different formats that is unknown,
      examining, by the computer system, at least the portion of the network event information for indicators about how at least the portion of the network event information is formatted, wherein at least a portion of the indicators comprise at least one of a file extension associated with at least the portion of the network event information, an Internet Protocol address where at least the portion of the network event information originated, or an indicator of a sensor providing at least the portion of the network event information, and
      routing, by the computer system, at least the portion of the network event information to a particular pre-processor selected, based at least in part on the indicators, to normalize at least the portion of the network event information into a standard format;
   storing, by the computer system, the normalized network event information in a first data store;
   performing, by the computer system, analysis to identify a subset of the normalized network event information;
   using, by the computer system, the subset of the normalized network event information to create, in a second data store, a model of a state of the network;
   running, by the computer system, a plurality of stored threat detection routines to query the second data store to detect threats to the network;
   providing, by the computer system, an indication of threats detected in response to running the plurality of stored threat detection routines; and
   in response to receiving an indication of a user query regarding the network, providing, by the computer system, query results that are determined based on accessing information from the normalized network event information stored in the first data store that is not also stored in the second data store.

2. The method of claim 1, wherein the subset of the normalized network event information identifies events determined, in the analysis, to alter the state of the network and wherein the model is a graph structure including a plurality of nodes linked together based on the events determined to alter the state of the network.

3. The method of claim 2, wherein the plurality of nodes includes nodes representative of ones of the plurality of network devices, nodes representative of users of the plurality of network devices, and nodes representative of software installed on the plurality of network devices.

4. The method of claim 2, wherein running one of the plurality of stored threat detection routines includes querying the second data store to determine whether a path of links exists between a first node and a second node included in the graph structure.

5. The method of claim 2, wherein an event is represented in the graph structure as a first node having a link to a second node, wherein the link identifies a predicate having the first node as a subject and the second node as an object.

6. The method of claim 5, wherein the event is a login of a particular user into a particular network device, and wherein the first node is representative of the particular user, the link is representative of the login, and the second node is representative of the particular network device.

7. The method of claim 5, wherein the event is an establishment of a network connection by a particular network device, wherein the first node is representative of the particular network device and the link is representative of the establishment of the network connection.

8. The method of claim 1, further comprising:
   receiving additional information from one or more sources other than the plurality of network devices; and
   including the additional information in the normalized network event information.

9. The method of claim 1, further comprising:
   determining, from running one of the plurality of stored threat detection routines, that additional network event information is warranted; and
   issuing a request for the additional network event information to one of the plurality of network devices.

10. The method of claim 1, further comprising providing the indication of threats and the query results as a service to an operator of the network.

11. The method of claim 1, wherein the computer system is a cloud computing system configured to maintain the first and second data stores.

12. A non-transitory computer readable medium of having program instructions stored therein that are executable by a computer system to cause the computer system to perform operations comprising:
   receiving network event information from a plurality of devices in a network, wherein the network event information is associated with a plurality of different formats;
   normalizing the network event information to produce normalized network event information, wherein normalizing the network event information comprises
      determining that at least a portion of the network event information is associated with a format of the plurality of different formats that is unknown,
      examining at least the portion of the network event information for indicators about how at least the portion of the network event information is formatted, wherein at least a portion of the indicators comprise at least one of a file extension associated with at least the portion of the network event information, an Internet Protocol address where at least the portion of the network event information originated, or an indicator of a sensor providing at least the portion of the network event information, and routing at least the portion of the network event information to a particular preprocessor selected, based at least in part on the indicators, to normalize at least the portion of the network event information into a standard format;

storing the normalized network event information in a first data store;

performing analysis to identify a subset of the normalized network event information;

using the subset of the normalized network event information to create, in a second data store, a model of a state of the network;

running a plurality of stored threat detection routines to query the second data store to detect threats to the network;

providing an indication of threats detected in response to running the plurality of stored threat detection routines; and in response to receiving an indication of a user query regarding the network, providing query results that are determined based on accessing information from the normalized network event information stored in the first data store that is not also stored in the second data store.

13. The non-transitory computer readable medium of claim 12, wherein the model is a graph structure having a plurality of linked nodes, wherein ones of the plurality of linked nodes represent ones of the plurality of devices.

14. The non-transitory computer readable medium of claim 13, wherein the plurality of stored threat detection routines query the second data store to identify paths in the graph structure between ones of the plurality of linked nodes.

15. The non-transitory computer readable medium of claim 12, wherein the operations further comprise issuing a request to one of the plurality of devices to receive additional network event information.

16. The non-transitory computer readable medium of claim 12, wherein the subset of the normalized network event information identifies events determined, in the analysis, to alter the state of the network.

17. A system comprising:
a processor; and
a memory storing instructions that, when executed by the processor, cause the processor to perform operations comprising
receiving network event information from a plurality of network devices in a network, wherein the network event information is associated with a plurality of different formats, normalizing the network event information to produce normalized network event information, wherein normalizing the network event information comprises
determining that at least a portion of the network event information is associated with a format of the plurality of different formats that is unknown,
examining at least the portion of the network event information for indicators about how at least the portion of the network event information is formatted, wherein at least a portion of the indicators comprise at least one of a file extension associated with at least the portion of the network event information, an Internet Protocol address where at least the portion of the network event information originated, or an indicator of a sensor providing at least the portion of the network event information, and
routing at least the portion of the network event information to a particular preprocessor selected, based at least in part on the indicators, to normalize at least the portion of the network event information into a standard format;

storing the normalized network event information in a first data store, performing analysis to identify a subset of the normalized network event information, using the subset of the normalized network event information to create, in a second data store, a model of a state of the network, running a plurality of stored threat detection routines to query the second data store to detect threats to the network, providing an indication of threats detected in response to running the plurality of stored threat detection routines, and in response to receiving an indication of a user query regarding the network, providing query results that are determined based on accessing information from the normalized network event information stored in the first data store that is not also stored in the second data store.

18. The system of claim 17, wherein the subset of the normalized network event information identifies events determined, in the analysis, to alter the state of the network, and wherein the model is a graph structure including a plurality of nodes linked together based on the events determined to alter the state of the network.

19. The system of claim 18, wherein the plurality of nodes includes nodes representative of ones of the plurality of network devices, nodes representative of users of the plurality of network devices, and nodes representative of software installed on the plurality of network devices.

20. The system of claim 18, wherein running one of the plurality of stored threat detection routines includes querying the second data store to determine whether a path of links exists between a first node and a second node included in the graph structure.

* * * * *